US010622860B2

(12) United States Patent
Park et al.

(10) Patent No.: US 10,622,860 B2
(45) Date of Patent: Apr. 14, 2020

(54) DRIVE MOTOR FOR VEHICLE

(71) Applicants: Hyundai Motor Company, Seoul (KR); Kia Motors Corporation, Seoul (KR)

(72) Inventors: Kyungsoo Park, Daejeon (KR); Sanghoon Moon, Gyeonggi-do (KR); Jung Shik Kim, Seoul (KR); Yong Jae Lee, Gyeonggi-do (KR); Nyeonhan Hong, Gangwon-do (KR); Hyoungjun Cho, Gyeonggi-do (KR); Suhyun Bae, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/194,438

(22) Filed: Nov. 19, 2018

(65) Prior Publication Data
US 2019/0181714 A1 Jun. 13, 2019

(30) Foreign Application Priority Data
Dec. 11, 2017 (KR) .......................... 10-2017-0169271

(51) Int. Cl.
*H02K 3/48* (2006.01)
*H02K 3/487* (2006.01)
(Continued)

(52) U.S. Cl.
CPC ............. *H02K 3/487* (2013.01); *H02K 3/493* (2013.01); *H02K 5/24* (2013.01); *H02K 11/02* (2013.01);
(Continued)

(58) Field of Classification Search
CPC ........... H02K 2213/03; H02K 2211/00; H02K 11/02; H02K 5/24; H02K 3/493; H02K 3/487; H02K 1/165; H02K 1/265
(Continued)

(56) References Cited

U.S. PATENT DOCUMENTS 3,366,812 A * 1/1968 Summerfield ......... H02K 1/146
310/216.072
4,780,636 A * 10/1988 Gandhi .................. H02K 1/165
310/49.23
(Continued)

*Primary Examiner* — Thanh Lam
(74) *Attorney, Agent, or Firm* — Mintz Levin Cohn Ferris Glovsky and Popeo, P.C.; Peter F. Corless

(57) ABSTRACT

A drive motor for a vehicle includes: a stator and a rotor, in which the stator includes: stator teeth which are disposed between multiple slots, respectively, the multiple slots being formed at predetermined intervals in a circumferential direction corresponding to an outer circumferential surface of the rotor, and have a blocking portion which protrudes toward one of the slots disposed at both sides, the blocking portion formed at one side of an inner circumferential surface of each of the stator teeth facing the rotor, and a groove which is formed radially outward at an opposite side of the inner circumferential surface of each of the stator teeth; and opening sections each of which is in communication with the slot and formed between the blocking portion and the opposite side of the inner circumferential surface of the stator tooth adjacent to the blocking portion, and the slot is opened radially through the opening section.

12 Claims, 5 Drawing Sheets

(51) Int. Cl.
*H02K 11/02* (2016.01)
*H02K 5/24* (2006.01)
*H02K 3/493* (2006.01)

(52) U.S. Cl.
CPC ...... *H02K 2211/00* (2013.01); *H02K 2213/03* (2013.01)

(58) Field of Classification Search
USPC ...... 310/51, 214–215, 216.69–216.74, 254.1
See application file for complete search history.

(56) References Cited

U.S. PATENT DOCUMENTS

| | | | | |
|---|---|---|---|---|
| 7,501,735 B2* | 3/2009 | Seo | ...................... | H02K 1/2733 |
| | | | | 310/162 |
| 7,969,058 B2* | 6/2011 | Rahman | .................. | H02K 29/03 |
| | | | | 310/156.01 |
| 8,058,765 B2* | 11/2011 | Rahman | ................... | H02K 3/12 |
| | | | | 310/201 |
| 8,222,790 B2* | 7/2012 | Sakata | .................. | F04C 11/008 |
| | | | | 310/214 |

* cited by examiner (a)　　　　　　　　　(b)

US 10,622,860 B2

DRIVE MOTOR FOR VEHICLE

CROSS-REFERENCE TO RELATED APPLICATION

This application claims under 35 U.S.C. § 119(a) the benefit of Korean Patent Application No. 10-2017-0169271 filed in the Korean Intellectual Property Office on Dec. 11, 2017, the entire contents of which are incorporated herein by reference.

BACKGROUND

(a) Technical Field

An exemplary embodiment of the present disclosure relates to an electrically-powered vehicle, more particularly, to a drive motor for use in the electrically-powered vehicle that is capable of inhibiting a shaft current from being generated.

(b) Description of the Related Art

Recently, purely electrically-powered environmentally-friendly vehicles such as electric vehicles or fuel cell vehicles have been developed. The electrically-powered environmentally-friendly vehicle has an electric motor (hereinafter, referred to as a drive motor) as a driving source that obtains rotational force from electrical energy instead of an internal combustion engine such as an engine in the related art.

The drive motor, which is used as a driving source for providing electric power to the environmentally-friendly vehicle, includes a motor housing, a stator which is fixedly installed in the motor housing, and a rotor which is disposed at a predetermined air gap from the stator and rotates about a rotating shaft as a driving shaft.

The drive motor of the environmentally-friendly vehicle is required to provide high efficiency and output density. In particular, because the electric vehicle needs to obtain overall vehicle power from the drive motor, the drive motor is required to provide torque and output.

The drive motor is required to be designed to have a smaller size while providing high torque density and high output density in order to supply torque and output at a high level in a limited space in the vehicle. For this reason, the drive motor may be vulnerable to problems of electromagnetic interference and leakage because higher electromagnetic energy acts in the limited space.

One of the causes of problems such as electromagnetic interference and leakage is a shaft current that is generated in a drive motor. When high-speed switching control is performed on the drive motor typically by using a 3-phase inverter, a higher harmonic noise voltage (common voltage) occurs as the high-speed switching control is performed by using the inverter.

An electric field caused by the common voltage moves free electrons on a steel plate of the rotor, thereby generating a shaft current on the rotating shaft. That is, the higher harmonic noise voltage induces a voltage on the shaft of the rotor through a parasitic capacitor between the stator and the rotor, thereby generating the shaft current.

The shaft current, which is generated on the shaft of the rotor, causes a difference in electric potential between an inner race and an outer race of a bearing while flowing along the shaft or flowing to the motor housing through the bearing, which may cause erosion of the bearing due to an electric discharge mechanism in the bearing. The erosion can have a severe effect on durability of the drive motor, such as causing damage to the bearing.

In addition, the shaft current is discharged to a speed reducer along the shaft of the rotor, which may cause AM noise that may lead to a problem of diminished quality of AM radio.

The above information disclosed in this Background section is only for enhancement of understanding of the background of the disclosure and therefore it may contain information that does not form the prior art that is already known in this country to a person of ordinary skill in the art.

SUMMARY

An exemplary embodiment of the present disclosure provides a drive motor including: a stator and a rotor, in which the stator includes: stator teeth which are disposed between multiple slots, respectively, the multiple slots being formed at predetermined intervals in a circumferential direction corresponding to an outer circumferential surface of the rotor, and have a blocking portion which protrudes toward one of the slots disposed at both sides, the blocking portion being formed at one side of an inner circumferential surface of each of the stator teeth facing the rotor, and a groove which is formed radially outward at the other (i.e., an opposite) side of the inner circumferential surface of each of the stator teeth; and opening sections each of which is in communication with the slot and formed between the blocking portion and the opposite side of the inner circumferential surface of the stator tooth adjacent to the blocking portion, and the slot is opened radially through the opening section.

The opening section may open one side portion of an inner surface of the slot radially inward.

A circumferential width of the blocking portion may be smaller than a circumferential width of the inner surface of the slot.

A stator coil may be wound around the stator tooth, and when the stator coil is wound around the stator tooth, the stator coil may enter the opening section through the groove formed at the opposite side of the inner circumferential surface of the stator tooth.

A stator coil may be wound around the stator tooth, and when the stator coil is wound around the stator tooth, the stator coil may be inserted into slots along an axial direction.

A circumferential width of the opening section may be smaller than a circumferential width of the blocking portion.

Another exemplary embodiment of the present disclosure provides a drive motor including: a stator and a rotor, in which the stator includes: stator teeth which are disposed between multiple slots, respectively, the multiple slots being formed at predetermined intervals in a circumferential direction corresponding to an outer circumferential surface of the rotor, and have a blocking portion which protrudes toward one of the slots disposed at both sides, the blocking portion being formed at one side of an inner circumferential surface of each of the stator teeth facing the rotor, and a groove which is formed radially outward at the opposite side of the inner circumferential surface of each of the stator teeth; and opening sections each of which is in communication with the slot and formed between the blocking portion and the opposite side of the stator tooth adjacent to the stator tooth, and the slot is opened in a circumferential direction through the opening section.

The opening section may radially extend to have a predetermined radial width from an inner surface of the slot to an outer surface of the slot.

A circumferential width of the blocking portion may be larger than a circumferential width of the inner surface of the slot.

A stator coil may be wound around the stator tooth, and when the stator coil is wound around the stator tooth, the stator coil may enter the opening section through the groove formed at the opposite side of the inner circumferential surface of the stator tooth.

A stator coil may be wound around the stator tooth, and when the stator coil is wound around the stator tooth, the stator coil may be inserted into slots along an axial direction.

The opening section may be formed integrally with the slot.

According to the exemplary embodiments of the present disclosure, the opening section between the stator coil and the rotor has an asymmetric structure formed asymmetrically with respect to the stator, and as a result, it is possible to reduce a parasitic capacitor between the stator coil and the rotor.

Therefore, according to the exemplary embodiment of the present disclosure, it is possible to reduce a magnitude of parasitic capacitance between the stator coil and the rotor, and as a result, an electric current to be transmitted to the rotor may be reduced, such that a shaft current on a rotating shaft may be reduced.

Therefore, according to the exemplary embodiment of the present disclosure, the shaft current on the rotating shaft may be reduced by a shield film, and as a result, it is possible to prevent erosion of a bearing caused by abnormal electrical conduction in the form of a spark, and it is possible to mitigate a problem of electromagnetic wave interference (e.g., AM noise) caused by the shaft current.

In addition, other effects, which may be obtained or expected by the exemplary embodiments of the present disclosure, will be directly or implicitly disclosed in the detailed description of the embodiments of the present disclosure. That is, various effects expected according to the exemplary embodiments of the present disclosure will be disclosed in the detailed description to be described below.

BRIEF DESCRIPTION OF THE DRAWINGS

The drawings are intended to be used as references for describing the exemplary embodiments of the present disclosure, and the technical spirit of the present disclosure should not be interpreted as being limited to the accompanying drawing.

DETAILED DESCRIPTION OF THE EMBODIMENTS

Figure 1:
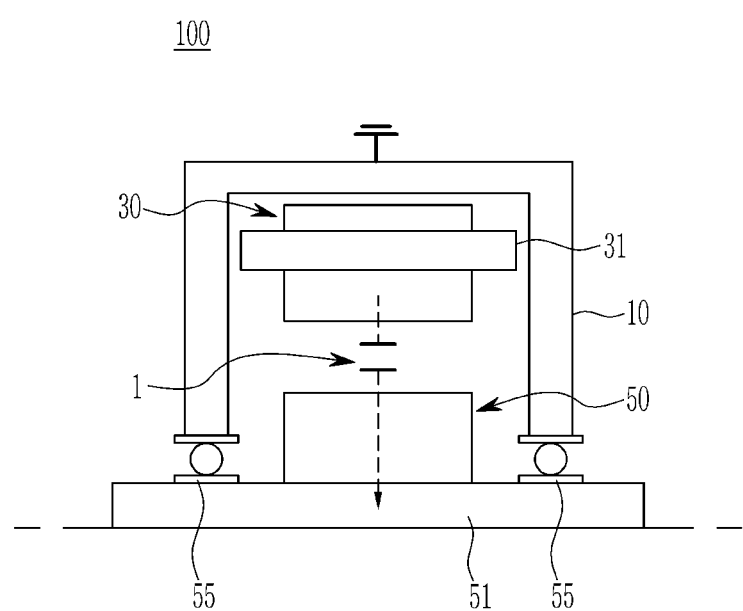
FIG. 1 is a view schematically illustrating a drive motor according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

A part irrelevant to the description will be omitted to clearly describe the present disclosure, and the same or similar constituent elements will be designated by the same reference numerals throughout the specification.

The size and thickness of each component illustrated in the drawings are arbitrarily shown for understanding and ease of description, but the present disclosure is not limited thereto. Thicknesses of several portions and regions are enlarged for clearly describing the above.

In addition, in the following description, names of constituent elements are classified as a first . . . , a second . . . , and the like so as to discriminate the constituent elements having the same name, and the names are not essentially limited to the order in the description below.

FIG. 1 is a view schematically illustrating a drive motor according to an exemplary embodiment of the present disclosure.

Referring to FIG. 1, a drive motor 100 according to an exemplary embodiment of the present disclosure may be applied as a driving source for providing electric power to an environmentally-friendly vehicle such as an electric vehicle or a fuel cell vehicle.

Further, the exemplary embodiment of the present disclosure may be applied to a drive motor 100 of a hybrid environmentally-friendly vehicle (e.g., a hybrid electric vehicle (HEV) or a plug-in hybrid electric vehicle (PHEV)) that uses driving power from an engine and electric power. Moreover, the exemplary embodiment of the present disclosure may be applied to a midsize hybrid drive motor 100 fixedly installed on an automatic transmission.

The drive motor 100, which is applied to the exemplary embodiments of the present disclosure, may be a permanent magnet synchronous motor (PMSM) or a wound rotor synchronous motor (WRSM).

However, it should not be interpreted that the protection scope of the present disclosure is limited to the drive motor of the environmentally-friendly electrically-powered vehicle, and the technical spirit of the present disclosure may be applied to drive motors used in various industrial fields.

The drive motor 100 includes a stator 30 which is fixedly installed in a motor housing 10, and a rotor 50 which is disposed at a predetermined air gap from the stator 30 and rotates about a rotating shaft 51 as a driving shaft. For example, the drive motor 100 may be an inner-rotor type synchronous motor in which the rotor 50 is disposed inside the stator 30.

Here, an overall external appearance of the stator 30 has a cylindrical shape. A stator coil 31 is wound around the stator 30. Further, the rotating shaft 51 is rotatably coupled to the motor housing 10 through front and rear bearings 55.

When high-speed switching control is performed on the drive motor 100 configured as described above by using a 3-phase inverter, a higher harmonic noise voltage occurs. The higher harmonic noise voltage induces a voltage to the rotating shaft 51 of the rotor 50 through a parasitic capacitor 1 between the stator 30 and the rotor 50, thereby generating a shaft current on the rotating shaft 51. The shaft current is discharged from the rotating shaft 51 to the motor housing 10 via the bearings 55, and in this case, there occurs a difference in potential between an inner race and an outer race of the bearing 55. Abnormal electrical conduction in the form of a spark may occur in the bearing 55 due to the difference in potential, which may cause erosion of the bearing 55. Further, the shaft current may be discharged to a speed reducer along the rotating shaft 51, which may cause AM noise, and thus may affect reception of an AM radio in the vehicle.

Figure 2:
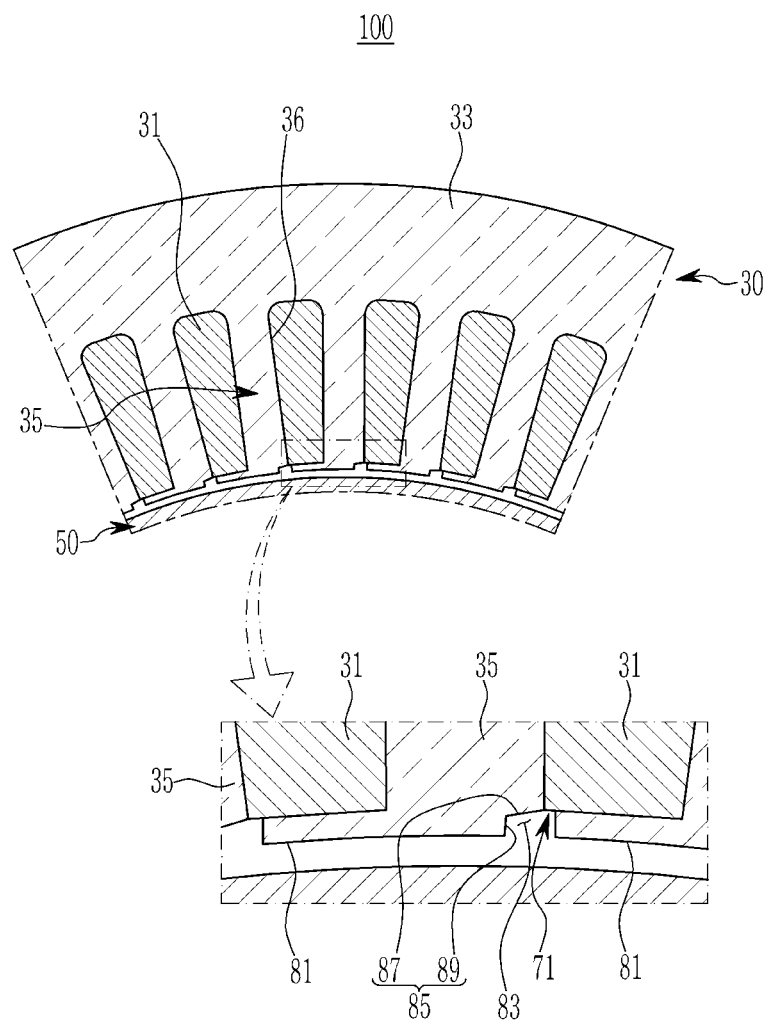
FIG. 2 is a view schematically illustrating a parasitic capacitor reducing structure of the drive motor according to the exemplary embodiment of the present disclosure.

To solve the problem of electromagnetic interference (AM noise and the like) caused by the shaft current and the problem of erosion of the bearing 55, the exemplary embodiment of the present disclosure provides the drive motor 100 capable of reducing the parasitic capacitor between the stator 30 and the rotor 50. FIG. 2 is a view schematically illustrating a parasitic capacitor reducing structure of the drive motor according to the exemplary embodiment of the present disclosure.

Hereinafter, a direction around the stator 30 is defined as a circumferential direction. A direction perpendicular to the plane on which the stator 30 and the rotor 50 are placed, that is, a direction in which the rotating shaft 51 extends is defined as an axial direction. In addition, a direction from a center in the stator 30 and the rotor 50 toward outer circumferential surfaces of the stator 30 and the rotor 50 is defined as a radial direction.

Referring to FIGS. 1 and 2, in the exemplary embodiment of the present disclosure, the stator 30 includes a core body 33 made by stacking multiple electric steel plates.

Multiple slots 36, which correspond to an outer circumferential surface of the rotor 50, are formed in the core body 33 in the circumferential direction at predetermined intervals.

In addition, the core body 33 has stator teeth 35 which are disposed between the multiple slots 36, respectively. Each of the stator teeth 35 extends inward in the radial direction.

A blocking portion 81, which protrudes toward one of the slots 35 disposed at both sides of the stator tooth 35, is formed at one side of the inner circumferential surface of the stator tooth 35 which faces the rotor 50. A groove 83, which is concave radially outward, is formed at the other (i.e., an opposite) side of the inner circumferential surface of the stator tooth 35 which faces the rotor 50.

In addition, the stator coil 31 is wound around the stator tooth 35. The stator coil 31 may be a declination coil (e.g., a hair pin type copper wire) or a round wire coil.

Meanwhile, the rotor 50 of the drive motor 100 may be a rotor of a permanent magnet type drive motor in which permanent magnets are embedded in a rotor core or may be a rotor of a wound rotor drive motor in which a rotor coil is wound around a rotor core.

Because the configuration of the rotor 50 is well known to those of ordinary skill in the art, a more detailed description of the configuration will be omitted from the present specification.

In the exemplary embodiment of the present disclosure, the blocking portion 81 is formed integrally with the stator tooth 35. A circumferential width of the blocking portion 81 is smaller than a circumferential width of an inner surface of the slot 36, and an air gap is formed between the blocking portion 81 and the rotor 50. Therefore, an opening section 71 is formed between the blocking portion 81 and the opposite side of the inner circumferential surface of the stator tooth 35 which is adjacent to the blocking portion 81 and faces the rotor 50.

The opening section 71 may be formed at one side of the inner surface of the slot 36 and may be formed to face an outer diameter surface of the rotor 50.

In addition, the opening section 71 may be formed integrally with the slot, and a circumferential width of the opening section 71 may be approximately 0.3 mm. The opening section 71 is in communication with the slot 36 and opens the slot 36 radially inward. That is, the slot 36 may be in communication with the groove 83 between the adjacent stator teeth 35 through the opening section 71.

Meanwhile, the groove 83, which is formed at the opposite side of the inner circumferential surface of the stator tooth 35, includes a first notch portion 85 and defines a space that opens the opening section 71 toward the outer circumferential surface of the rotor 50.

When the stator coil 31 is wound around the stator tooth 35, the stator coil 31 enters the opening section 71 through the groove 83. Then the stator coil 31 may be round wire coil.

If the stator coil 31 is declination coil, the stator coil 31 is inserted into the slots 36 along an axial direction, when the stator coil 31 is wound around the stator tooth 35.

Here, the first notch portion 85 includes a first notch surface 87 which meets the slot 36 and is formed in the circumferential direction from the opposite side where the groove 83 of the stator tooth 35 is formed, and a second notch surface 89 which meets the inner circumferential surface of the stator tooth 35 and extends radially inward from the first notch surface 87. An effect of the drive motor 100 configured as described above will be described with reference to FIG. 3.

Figure 3:
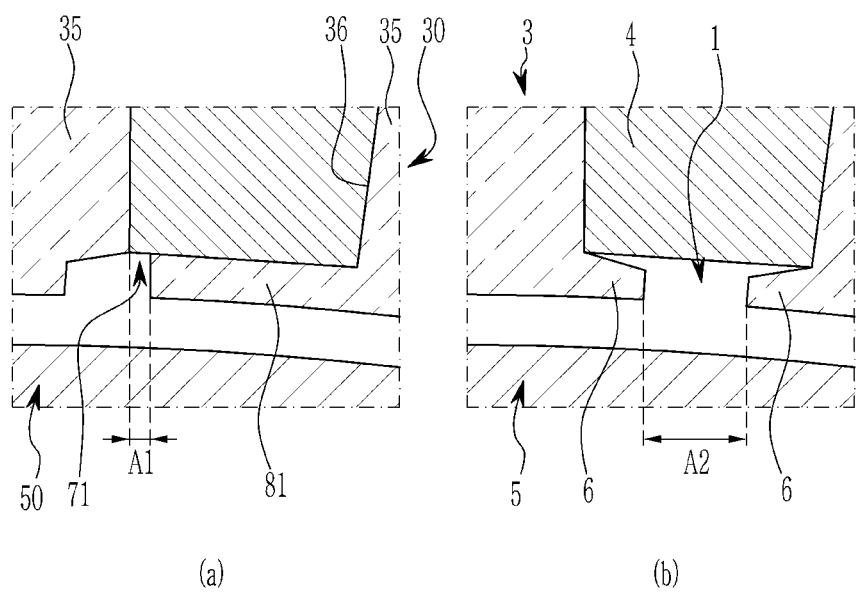
FIG. 3 is a view for explaining an operational effect of the drive motor according to the exemplary embodiment of the present disclosure.

FIG. 3 is a view for explaining an operational effect of the drive motor according to the exemplary embodiment of the present disclosure.

Referring to FIG. 3, specifically, in the exemplary embodiment of the present disclosure, the blocking portion 81 is formed at one protruding side of the inner circumferential surface of the stator tooth 35 which faces the rotor 50, as illustrated in FIG. 3 (a).

Further, in the drive motor 100 according to the exemplary embodiment of the present disclosure, the opening section 71, which opens the slot 36 radially inward and faces the outer diameter surface of the rotor 50, is formed between the blocking portion and the opposite side of the inner circumferential surface of the stator tooth 35 adjacent to the blocking portion 81.

Meanwhile, in the related art illustrated in FIG. 3 (b), as a comparative example with respect to the exemplary embodiment of the present disclosure, an opening section 1 is formed between ends of adjacent stator shoes 6 which face each other.

Therefore, it can be seen that a cross-sectional area A1 of the opening section 71 according to the exemplary embodiment of the present disclosure is smaller than a cross-sectional area A2 of the opening section 1 according to the comparative example. As described above, in the exemplary embodiment of the present disclosure, the cross-sectional area A1 of the opening section 71 is reduced as compared to the comparative example, and as a result, a magnitude of parasitic capacitance between the stator 30 and the rotor 50 may be reduced. This reduction in the cross-sectional area is derived based on a numerical formula in which a magnitude C of the parasitic capacitance is proportional to the cross-sectional area A but inversely proportional to a distance d between the stator coil and the rotor.

Therefore, in the exemplary embodiment of the present disclosure, it is possible to reduce the magnitude of the parasitic capacitance between the stator coil 31 and the rotor 50, and as a result, it is possible to reduce an electric current to be transmitted to the rotor 50 to reduce a shaft current on the rotating shaft 51, thereby preventing erosion of the bearing 55 and mitigating AM noise.

Figure 4:
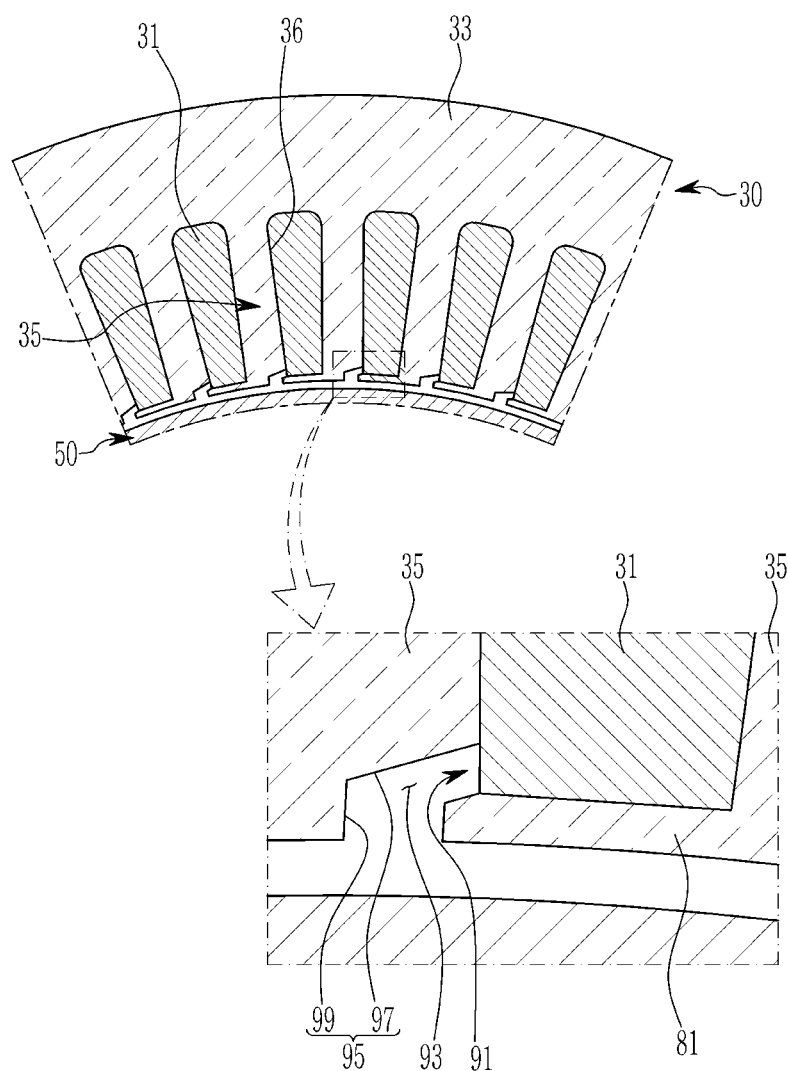
FIG. 4 is a view schematically illustrating a parasitic capacitor reducing structure of a drive motor according to another exemplary embodiment of the present disclosure.

FIG. 4 is a view schematically illustrating a parasitic capacitor reducing structure of a drive motor according to another exemplary embodiment of the present disclosure. In the drawings, like reference numerals refer to constituent elements identical to those in the aforementioned exemplary embodiment.

Referring to FIG. 4, a drive motor 200 according to another exemplary embodiment of the present disclosure includes a stator 30 and a rotor 50.

The stator 30 includes a core body 33, multiple stator teeth 35, and multiple slots 36. Each of the stator teeth 35 extends inward in the radial direction.

The stator teeth 35 are formed between the multiple slots 36, respectively. A blocking portion 81, which protrudes toward one of the slots 35 disposed at both sides of the stator tooth 35, is formed at one side of the inner circumferential surface of the stator tooth 35 which faces the rotor 50. A concave groove 95 is formed at the opposite side of the inner circumferential surface of the stator tooth 35 which faces the rotor 50.

The blocking portion 81 is formed to face an outer circumferential surface of the rotor 50, and a circumferential width of the blocking portion 81 is larger than a circumferential width of an inner surface of the slot 36.

An opening section 91, which opens the slot 36 in the circumferential direction, is formed between the blocking portion 81 and the opposite side of the inner circumferential surface of the stator tooth 35 which is adjacent to the blocking portion 81 and faces the rotor 50.

That is, the opening section 91 extends radially to have a predetermined width from an inner surface of the slot 36 to an outer surface of the slot 36, and the opening section 91 opens the slot 36 in the circumferential direction.

In addition, the opening section 91 is in communication with the slot 36 and meets the outer circumferential surface of the rotor 50 through the groove 93.

In addition, the groove 93 formed at the opposite side of the stator tooth 35 is formed by a second notch portion 95, and the groove 93 obliquely opens the opening section 91 toward the outer circumferential surface of the rotor 50.

When a stator coil 31 is wound around the stator tooth 35, the stator coil 31 enters the opening section 91 through the groove 93. Then the stator coil 31 may be round wire coil.

If the stator coil 31 is declination coil, the stator coil 31 is inserted into the slots 36 along an axial direction, when the stator coil 31 is wound around the stator tooth 35.

Here, the second notch portion 95 includes a first notch surface 97 which meets the slot 36 and is formed in the circumferential direction from the opposite side where the groove 93 of the stator tooth 35 is formed, and a second notch surface 99 which meets the inner circumferential surface of the stator tooth 35 and extends radially inward from the first notch surface 97.

Hereinafter, an operational effect of the drive motor 200 according to another exemplary embodiment of the present disclosure, which is configured as described above, will be specifically described with reference to FIG. 5.

Figure 5:
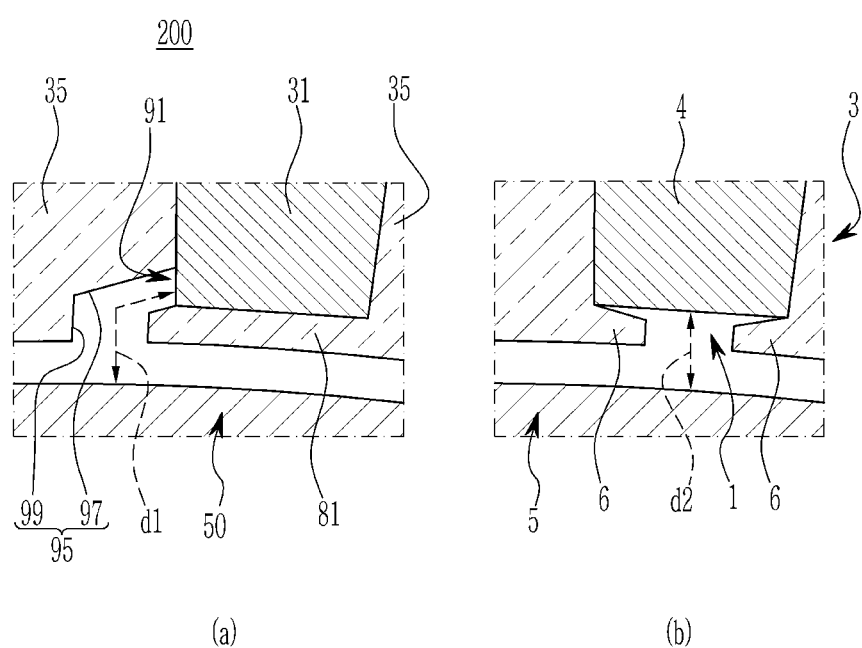
FIG. 5 is a view for explaining an operational effect of the drive motor according to another exemplary embodiment of the present disclosure.

FIG. 5 is a view for explaining an operational effect of the drive motor according to another exemplary embodiment of the present disclosure.

First, as illustrated in FIG. 5 (a), in the exemplary embodiment of the present disclosure, the blocking portion 81 is formed at one protruding side of the inner circumferential surface of the stator tooth 35 which faces the rotor 50.

Further, in the drive motor 200 according to the exemplary embodiment of the present disclosure, the opening section 91, which opens the slot 36 in the circumferential direction and intersects an outer diameter surface of the rotor 50, is formed between the blocking portion 81 and the opposite side of the stator tooth 35 adjacent to the blocking portion 81.

Further, in the exemplary embodiment of the present disclosure, the concave groove 83 is formed at the opposite side of the inner circumferential surface of the stator tooth 35 which faces the rotor 50, and the second notch portion 95 is formed in the groove 83.

Further, the second notch portion 95 has the first notch surface 97 and the second notch surface 99.

Meanwhile, in the related art illustrated in FIG. 5 (b), as a comparative example with respect to the exemplary embodiment of the present disclosure, an opening section 1 is formed between both ends of adjacent stator shoes 6 which face each other.

Therefore, as illustrated in FIG. 5, it can be seen that a distance d1 between the opening section 91 and the rotor 50 according to the exemplary embodiment of the present disclosure is longer than a distance d2 between the opening section 1 and the rotor 5 according to the comparative example. That is, in the exemplary embodiment of the present disclosure, the second notch portion 95, which has the second notch surface 97 inclined in the circumferential direction toward the rotor 50, is formed at the opposite side where the groove 93 of the stator tooth 35 is formed, and as a result, by the second notch portion 95, the distance d1 between the opening section 91 and the rotor 50 may be longer than the distance d2 between the opening section 1 and the rotor 5 according to the comparative example. As described above, in the exemplary embodiment of the present disclosure, the distance d1 between the opening section 91 and the rotor 50 is increased as compared to the comparative example, and as a result, the magnitude of parasitic capacitance may be reduced.

This reduction in distance is derived based on a numerical formula in which a magnitude C of the parasitic capacitance is proportional to the cross-sectional area A but inversely proportional to the distance d between the stator coil and the rotor. Since the remaining configurations and operational effects of the drive motor 200 according to another exemplary embodiment of the present disclosure are identical to those in the aforementioned exemplary embodiment, further detailed descriptions thereof will be omitted.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A drive motor, comprising:
a stator; and
a rotor, wherein the stator includes:
stator teeth which are disposed between multiple slots, respectively, the multiple slots being formed at predetermined intervals in a circumferential direction corresponding to an outer circumferential surface of the rotor, and have a blocking portion which protrudes toward one of the slots disposed at both sides, the blocking portion being formed at one side of an inner circumferential surface of each of the stator teeth facing the rotor, and a groove which is formed radially outward at an opposite side of the inner circumferential surface of each of the stator teeth; and
opening sections each of which is in communication with the slot and formed between the blocking portion and the opposite side of the inner circumferential surface of the stator tooth adjacent to the blocking portion, and
the slot is opened radially through the opening section.

2. The drive motor of claim 1, wherein:
the opening section opens one side portion of an inner surface of the slot radially inward.

3. The drive motor of claim 1, wherein:
a circumferential width of the blocking portion is smaller than a circumferential width of an inner surface of the slot.

4. The drive motor of claim 1, wherein:
a stator coil is wound around the stator tooth, and
when the stator coil is wound around the stator tooth, the stator coil enters the opening section through the groove formed at the opposite side of the inner circumferential surface of the stator tooth.

5. The drive motor of claim 1, wherein:
a stator coil is wound around the stator tooth, and
when the stator coil is wound around the stator tooth, the stator coil is inserted into the slots along an axial direction.

6. The drive motor of claim 1, wherein:
a circumferential width of the opening section is smaller than a circumferential width of the blocking portion.

7. A drive motor comprising:
a stator; and
a rotor, wherein the stator includes:
stator teeth which are disposed between multiple slots, respectively, the multiple slots being formed at predetermined intervals in a circumferential direction corresponding to an outer circumferential surface of the rotor, and have a blocking portion which protrudes toward one of the slots disposed at both sides, the blocking portion being formed at one side of an inner circumferential surface of each of the stator teeth facing the rotor, and a groove which is formed radially outward at the opposite side of the inner circumferential surface of each of the stator teeth; and
opening sections each of which is in communication with the slot and formed between the blocking portion and the opposite side of the stator tooth adjacent to the stator tooth, and
the slot is opened in a circumferential direction through the opening section.

8. The drive motor of claim 7, wherein:
the opening section radially extends to have a predetermined radial width from an inner surface of the slot to an outer surface of the slot.

9. The drive motor of claim 7, wherein:
a circumferential width of the blocking portion is larger than a circumferential width of an inner surface of the slot.

10. The drive motor of claim 7, wherein:
a stator coil is wound around the stator tooth, and
when the stator coil is wound around the stator tooth, the stator coil enters the opening section through the groove formed at the opposite side of the inner circumferential surface of the stator tooth.

11. The drive motor of claim 7, wherein:
a stator coil is wound around the stator tooth, and
when the stator coil is wound around the stator tooth, the stator coil is inserted into the slots along an axial direction.

12. The drive motor of claim 7, wherein:
the opening section is formed integrally with the slot.

* * * * *